United States Patent
Choi et al.

(10) Patent No.: US 11,655,354 B2
(45) Date of Patent: May 23, 2023

(54) COATING-FREE METALLIC THERMOPLASTIC RESIN COMPOSITION HAVING IMPROVED METALLIC TEXTURE AND GLOSS

(71) Applicants: Hyundai Motor Company, Seoul (KR); Kia Motors Corporation, Seoul (KR); Daewon Chemical Co., Ltd, Chungcheongnam-do (KR)

(72) Inventors: Min Jin Choi, Gyeonggi-do (KR); Se Jong Hwang, Gyeonggi-do (KR); Ki Hun Park, Chungcheongnam-do (KR); Jin Hyung Jeong, Gyeonggi-do (KR)

(73) Assignees: Hyundai Motor Company, Seoul (KR); Kia Motors Corporation, Seoul (KR); Daewon Chemical Co., Ltd, Cheonan (KR)

( * ) Notice: Subject to any disclaimer, the term of this patent is extended or adjusted under 35 U.S.C. 154(b) by 67 days.

(21) Appl. No.: 16/868,341

(22) Filed: May 6, 2020

(65) Prior Publication Data
US 2021/0179838 A1   Jun. 17, 2021

(30) Foreign Application Priority Data
Dec. 13, 2019   (KR) .......................... 10-2019-0166590

(51) Int. Cl.
| | | |
|---|---|---|
| C08K 3/08 | (2006.01) | |
| C08L 53/00 | (2006.01) | |
| C08K 9/08 | (2006.01) | |
| C08K 5/00 | (2006.01) | |
| C08K 5/13 | (2006.01) | |
| C08K 5/3492 | (2006.01) | |
| C08K 5/49 | (2006.01) | |

(52) U.S. Cl.
CPC .............. *C08K 3/08* (2013.01); *C08K 5/005* (2013.01); *C08K 5/13* (2013.01); *C08K 5/3492* (2013.01); *C08K 5/49* (2013.01); *C08K 9/08* (2013.01); *C08L 53/00* (2013.01); *C08L 2201/08* (2013.01); *C08L 2207/04* (2013.01)

(58) Field of Classification Search
CPC .. C08L 33/20; C08L 2201/08; C08L 2310/00; C08L 53/00; C08K 9/08; C08K 3/08; C08K 5/005; C08K 5/132; C08K 5/3475; C08K 5/3492; C08K 5/13; C08K 5/49
See application file for complete search history.

(56) References Cited

U.S. PATENT DOCUMENTS

| | | | |
|---|---|---|---|
| 10,160,855 B2 | 12/2018 | Choi et al. | |
| 2006/0276571 A1* | 12/2006 | Sharma | C08F 255/02 524/98 |
| 2008/0242779 A1* | 10/2008 | Gaggar | C08L 33/12 524/261 |
| 2010/0022689 A1* | 1/2010 | Yukino | C08K 5/1345 524/99 |
| 2016/0237223 A1* | 8/2016 | Takemura | C08J 3/226 |
| 2017/0312805 A1 | 11/2017 | Kim et al. | |
| 2017/0335098 A1 | 11/2017 | Choi et al. | |

FOREIGN PATENT DOCUMENTS

| | | | | |
|---|---|---|---|---|
| CN | 102516700 A | * | 6/2012 | ............. C08K 13/06 |
| CN | 106009471 A | * | 10/2016 | ............. B29C 48/92 |
| CN | 107336444 A | | 11/2017 | |
| CN | 107400325 A | | 11/2017 | |
| CZ | 2017-211 A3 | | 1/2018 | |
| KR | 2012-0005256 A | | 1/2012 | |
| KR | 101836622 B1 | | 3/2018 | |
| KR | 101856319 B1 | | 5/2018 | |
| KR | 101947230 B1 | | 5/2019 | |
| WO | WO2019007957 A1 | * | 1/2019 | ............. C08L 51/04 |

OTHER PUBLICATIONS

BASF; Irganox® B 900 Technical Data Sheet, 2011, p. 1-2.*
LG; ABS & ASA Product Data Sheet, 2018, p. 1-10.*
Karian, H.G.; Handbook of Polypropylene and Polypropylene Composites, 2009, p. 579.*
McKeen, L.W.; Permeability Properties of Plastics and Elastomers, 2012, p. 77-88.*
Clariant; The Coloration of Plastics and Rubber, Sep. 2019, p. 1-96.*
Clariant; Lubricants for Plastic Processing, 2013, p. 1-8.*
Clariant; Licocene® PE MA 4351 Product Data, 2022, p. 1-5.*

* cited by examiner

*Primary Examiner* — Robert S Jones, Jr.
(74) *Attorney, Agent, or Firm* — Fox Rothschild LLP

(57) ABSTRACT

Disclosed area coating-free metallic thermoplastic resin composition having improved metallic texture and gloss and a molded product having extrusion-molded the same. For example, the molded produce may be manufactured by feeding a master batch containing a styrene-acrylonitrile (SAN) resin and a metal in a weather resistant thermoplastic resin containing an acrylonitrile styrene acrylate (ASA) resin in a side feeding method. The coating-free metallic thermoplastic resin composition may be optimized in types and contents of the master batch and dispersant contained therein. The molded product may be manufactured by feeding the master batch in the side feeding method to improve various physical properties, increase the dispensability and compatibility between compositions, and improve black streaks and flow marks, thereby improving metallic texture and gloss as well as suppressing the occurrence of the appearance defects.

8 Claims, 2 Drawing Sheets

COATING-FREE METALLIC THERMOPLASTIC RESIN COMPOSITION HAVING IMPROVED METALLIC TEXTURE AND GLOSS

CROSS-REFERENCE TO RELATED APPLICATION

This application claims under 35 U.S.C. § 119(a) the benefit of priority to Korean Patent Application No. 10-2019-0166590 filed on Dec. 13, 2019, the entire contents of which are incorporated herein by reference.

TECHNICAL FIELD

The present invention relates to a coating-free metallic thermoplastic resin composition having improved metallic texture and gloss and a molded product having extrusion-molded the same. For example, the molded product may be formed using a side feeding method such that a master batch containing Styrene-acrylonitrile (SAN) resin and a metal in a weather resistant thermoplastic resin containing an Acrylonitrile styrene acrylate (ASA) resin may be fed into a mold.

BACKGROUND

Recently, there have been many application cases for implementing the coating-free for the purpose of reducing the manufacturing costs of exterior parts of a vehicle and responding to environment. In particular, a polypropylene resin has been mainly applied as materials of vehicle interior and exterior parts due to the advantages of low specific gravity, low cost, chemical resistant, impact resistant, and the like. However, the coating-free application of the polypropylene had appearance problems (Weld Line, Sink, Flow Mark, and the like) after the injection molding and limitations in implementing the coating-specific advantages such as high gloss and scratch resistant.

In order to solve these problems, a conventional technology has applied, in most cases, a styrene-based polymer rubber and a nucleating agent to a polypropylene homopolymer resin in order to express high gloss while increasing coloring of a polypropylene resin to implement the coating-specific appearance to improve them in the method of feeding small amounts of inorganic fillers or not feeding it at all in order to secure transparency of the resin and increase scratch resistant. However, due to the low content of the inorganic filler and the limited choice range of the high-flow polypropylene homopolymer, it is difficult to maintain stable balance of the material physical properties such as dimensional stability, mechanical properties, and heat resistant of the molded product, and a molding problem of thinned parts In particular, since there is a limit in expressing the coating-specific luxurious appearance, it has been difficult to apply them as materials of the vehicle coating-free parts.

The above information disclosed in this Background section is only for enhancement of understanding of the background of the invention and accordingly it may contain information that does not form the prior art that is already known in this country to a person of ordinary skill in the art.

SUMMARY

In one preferred aspect, provided is a coating-free metallic thermoplastic resin composition that includes a weather resistant thermoplastic resin, a master batch, a weather resistant stabilizer, an antioxidant, a scratch resistant agent, and a dispersant in a certain content.

In one preferred aspect, provided is a molded product obtained by feeding and extrusion-molding a master batch contained in the metallic thermoplastic resin composition, for example, in a side feeding method.

The aspects of the present invention are not limited to the above-description. The other aspects of the present invention will become clearer by the following description, and will be realized by the means and combinations thereof recited in claims.

In an aspect, a coating-free metallic thermoplastic resin composition may include a weather resistant thermoplastic resin, a master batch, a weather resistant stabilizer, an antioxidant, a scratch resistant agent, and a dispersant.

The coating-free metallic thermoplastic resin composition (the "composition") may include an amount of about 91 to 98 wt % of the weather resistant thermoplastic resin, an amount of about 0.5 to 5 wt % of the master batch, an amount of about 0.1 to 2.0 wt % of the weather resistant stabilizer, an amount of about 0.1 to 2.0 wt % of the antioxidant, an amount of about 1 to 5 wt % of the scratch resistant agent, and an amount of about 0.1 to 2.0 wt % of the dispersant, based on the total weight of the coating-free metallic thermoplastic resin composition.

The weather resistant thermoplastic resin may contain an acrylonitrile styrene acrylate (ASA) resin having a melting index of about 5 to 30 g/10 min (220° C., 10 kg) and/or a heat deformation temperature of about 90 to 95° C.

The master batch may include an admixture of a resin and a metallic component (composition containing a metal) and may suitably comprise an amount of about 20 to 80 wt % of a metallic component and an amount of about 20 to 80 wt % of a polymer resin based on the total weight of the master batch.

The metallic component may suitably include for example one or more metals selected from the group consisting of aluminum (Al), copper (Cu), and pearl (Pearl).

The term "metallic component" as used herein refers to a material that can provide metallic appearance, texture, and/or color as being applied on a substrate. The metallic component may suitably include one or more metal elements and/or one or more natural materials containing natural dye or substance to impart metallic color or reflection, or otherwise including an organic component.

In exemplary master batch compositions, a variety of polymer resins may be employed and suitably include various aromatic polymers and copolymers such as for example a phenyl-containing polymer that include acrylate (includes substituted acrylate such as methacrylates), acrylonitrile copolymer units. A styrene-acrylonitrile (SAN) resin is one preferred resin of a master batch composition. Other aromatic polymers also will be preferred for use in a master batch including phenolic polymers and copolymers such as a novolac.

The weather resistant stabilizer may suitably include one more selected from the group consisting of an UV absorber and a light stabilizer.

A mass ratio of the UV absorber:the light stabilizer of the weather resistant stabilizer may range from about 1:1.0 to about 1.0:1.

The UV absorber may suitably include one or more selected from the group consisting of a benzotriazole-based compound, a benzophenone-based compound, and a triazine-based compound.

The light stabilizer may suitably include one or more hindered amine-based compounds.

The antioxidant may suitably include one or more selected from the group consisting of a phenol-based antioxidant and a phosphorous-based antioxidant.

A mass ratio of the phenol-based antioxidant:the phosphorous-based antioxidant of the antioxidant may range of about 1:1.0 to about 1.0:1.

The dispersant may suitably include one or more selected from the group consisting of a commercial lubricant, an internal lubricant, and an external lubricant.

In an aspect, provided is a molded product manufactured using the coating-free metallic thermoplastic resin composition as described herein, for example, by injection-molding.

The molded product may be obtained by feeding and injection-molding the master batch contained in the coating-free metallic thermoplastic resin composition in a side feeding method.

The coating-free metallic thermoplastic resin composition and the molded product having extrusion-molded the same may optimize the types and contents of the master batch and dispersant contained therein and feed the master batch in the side feeding method to increase the dispensability and compatibility between compositions and improve the black streak and the flow mark as well as improving various physical properties, thereby improving the metallic texture and the gloss as well as suppressing the occurrence of the appearance defects.

The effects of the present invention are not limited to the effects mentioned above. It should be understood that the effects of the present invention include all the effects inferable from the following description.

The other aspects of the invention are discussed infra.

BRIEF DESCRIPTION OF THE DRAWINGS

The above and other features of the present invention will now be described in detail with reference to certain exemplary embodiments thereof illustrated the accompanying drawings which are given herein below by way of illustration only, and thus are not limitative of the present invention, and wherein.

Figure 1:
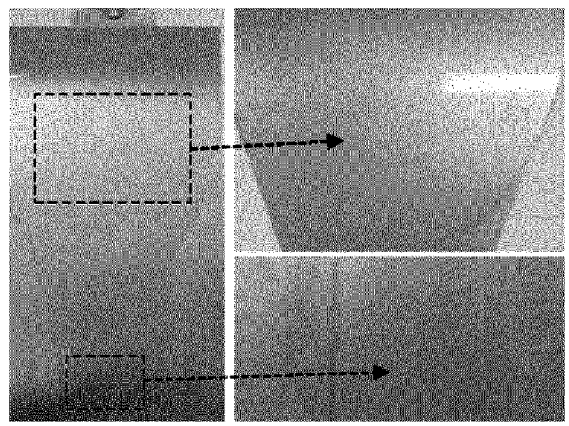
FIG. 1 shows an image that black streaks and flow marks were improved and metallic texture and gloss were excellent in an exemplary molded product (Embodiment 1) manufactured according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in section by the particular intended application and use environment.

In the figures, reference numbers refer to the same or equivalent sections of the present invention throughout the several figures of the drawing.

DETAILED DESCRIPTION

As described above, objects, other objects, features, and advantages according to the present invention will be readily understood through the following preferred embodiments associated with the accompanying drawings. However, the present invention is not limited to the embodiments described herein and may also be embodied in other forms. Rather, the embodiments introduced herein are provided so that the invention may be made thorough and complete, and the spirit according to the present invention may be sufficiently conveyed to those skilled in the art.

In this specification, it should be understood that terms such as "comprise" or "have" are intended to indicate that there is a feature, a number, a step, an operation, a component, a part, or a combination thereof described on the specification, and do not exclude the possibility of the presence or the addition of one or more other features, numbers, steps, operations, components, parts, or combinations thereof. Further, when a portion such as a layer, a film, a region, or a plate is referred to as being "above" the other portion, it may be not only "right above" the other portion, or but also there may be another portion in the middle. On the contrary, when a portion such as a layer, a film, a region, or a plate is referred to as being "under" the other portion, it may be not only "right under" the other portion, or but also there may be another portion in the middle.

Unless otherwise indicated, all numbers, values, and/or expressions referring to quantities of ingredients, reaction conditions, polymer compositions, and formulations used herein are to be understood as modified in all instances by the term "about" as such numbers are inherently approximations that are reflective of, among other things, the various uncertainties of measurement encountered in obtaining such values.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Further, where a numerical range is disclosed herein, such range is continuous, and includes unless otherwise indicated, every value from the minimum value to and including the maximum value of such range. Still further, where such a range refers to integers, unless otherwise indicated, every integer from the minimum value to and including the maximum value is included.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Metallic Thermoplastic Resin Composition

The metallic thermoplastic resin composition is not particularly limited as long as it is mainly a composition capable of constituting external vehicle parts in which the physical properties should not be reduced even in the environment such as oxygen, ozone, or ultraviolet light between vehicle parts.

In an aspect, a metallic thermoplastic resin composition may include a weather resistant thermoplastic resin, a master batch, a weather resistant stabilizer, an antioxidant, a scratch resistant agent, and a dispersant.

Preferably, the metallic thermoplastic resin composition may suitably include an amount of about 91 to 98 wt % of the weather resistant thermoplastic resin, an amount of about 0.5 to 5 wt % of the master batch, an amount of about 0.1 to 2.0 wt % of the weather resistant stabilizer, an amount of about 0.1 to 2.0 wt % of the antioxidant, an amount of about 1 to 5 wt % of the scratch resistant agent, and an amount of about 0.1 to 2.0 wt % of the dispersant, based on total weight of the metallic thermoplastic resin composition.

(1) Weather Resistant Thermoplastic Resin

The weather resistant thermoplastic resin is not particularly limited as long as it is a resin which is excellent in the impact resistant and workability, excellent in the mechanical strength, and difficult to cause weather resistant deterioration.

The weather resistant thermoplastic resin may suitably include one or more selected from the group consisting of typically known weather resistant thermoplastic resins, for example, an acrylonitrile styrene acrylate (ASA) resin, an acrylonitrile chloroprene styrene (ACS) resin, an acrylonitrile ethylene propylene styrene (AES) resin, and the like, and is not limited to a specific component. The weather resistant thermoplastic resin may preferably include the ASA resin having molecular structure which is excellent in the weather resistant. Moreover, the ASA resins may be resistant to the weather resistant deterioration due to the characteristics which is dissociated from the light having high wavelength energy of 300 nm or less by using an acrylic rubber without double bonding instead of butadiene. As such, even when used in outdoor exposure for a long time, changes in the appearance and physical properties may be remarkably small, and the physical properties such as heat resistant, chemical resistant, dimensional stability, and rigidity are excellent as compared with the ABS.

The ASA resin may have the physical properties such as a melting index of about 5 to 30 g/10 min (220° C., 10 kg) of a melting index, heat deformation temperature of about 90 to 95° C. of, and a flexural modulus of about 2,000 MPa or greater. When the melting index is less than about 5 g/10 min, there are problems of the reduction in foldability due to the reduction in flow ability and the appearance defects of a molded product such as flow marks. When the weather resistant thermoplastic resin is greater than about 30 g/10 min, heat resistant and impact strength may be reduced. Further, when the heat deformation temperature is less than about 90° C., there is a disadvantage of occurring deformation of the product due to the heat deformation, and when the heat deformation temperature is greater than about 95° C., the impact resistant may be reduced. Further, when the flexural modulus is less than about 2,000 MPa, the rigidity of the product may be reduced, which may be unsuitable for use in vehicle exterior parts.

The content of the weather resistant thermoplastic resin may be about 91 to 98 wt % based on the total weight of the coating-free metallic thermoplastic resin composition. When the content of the weather resistant thermoplastic resin is less than about 91 wt %, a change in the inherent physical properties of the ASA resin may be large, thereby occurring various problems such as weather resistant, rigidity, impact resistant, heat resistant, dimension stability, and foldability. There is a problem in that the rigidity is reduced and the heat resistant is reduced, thereby making it difficult to exert a function of the molded product, and when the content of the weather resistant thermoplastic resin is greater than about 98 wt %, there is a disadvantage of reducing the characteristics required for the present invention, such as weather resistant, scratch resistant, dispensability, and metallic texture.

(2) Master Batch

The master batch is not particularly limited as long as it may improve compatibility in the thermoplastic resin composition of the present invention in order to minimize the appearance defects such as black streaks and flow mark seven while giving metallic texture to the coating-free metallic thermoplastic resin composition containing the same.

The master batch may suitably include a polymer resin containing a typically known master batch. The master batch may include a metallic component or the like, for example, the metallic component may contain metal powders, flakes, or the like of one type or more selected from the group consisting of aluminum (Al), copper (Cu), pearl (Pearl), copper-zinc (Cu—Zn), and the like. The polymer resin may suitably include one or more resins selected from the group consisting of a styrene-acrylonitrile (SAN) resin, polystyrene (PS), polyethylene wax and polymethyl methacrylate (PMMA), PP, ASA, ABS, and the like, and is not limited to one containing the metal and polymer resin of a specific component. Preferably, the polymer resin may include the SAN resin containing an aluminum flake which is excellent in compatibility with the weather resistant thermoplastic resin, and excellent in expression and dispersion of a metal color.

Since the master batch contains the SAN resin as a metal carrier, the dispensability and compatibility may be increased between compositions and improve the black streaks and the flow marks.

The master batch may suitably include the SAN resin in addition to the metallic component, thereby implementing various metallic textures as well as increasing the compatibility. For example, when it contains the aluminum flake, the metallic texture of a metal silver color may be implemented; when it contains a copper-zinc flake, the metallic texture of a gold color may be implemented; and when it contains the pearl, preferably, mica, and more preferably, synthetic mica or natural mica, the metallic textures of various colors may be implemented. The metallic component is not limited to a specific metal.

The master batch according to the present invention may suitably include an amount of about 20 to 80 wt % of the metallic component and an amount of about 20 to 80 wt % of the polymer resin. When the content of the metallic component is less than about 20 wt %, there is a disadvantage in that the impact strength is reduced, thereby not satisfying the characteristics required. When the content of the metallic component is greater than about 80 wt %, there are disadvantages in that the dispensability may be deteriorated, thereby reducing pinholes, flow marks, gas smudges, gloss, metallic texture, and the like, and there may be problem for controlling the side feeding.

The master batch may be an amount of about 0.5 to 5 wt % based on the total weight of the coating-free metallic thermoplastic resin composition. When the content of the master batch is less than about 0.5 wt %, there is a disadvantage of reducing the metallic texture due to the inherent color of the resin, and when the content of the master batch is greater than about 5 wt %, the dispersion of the metal particles may not be properly performed, thereby worsening pinholes, flow marks, gas smudges, gloss, metallic texture, and the like.

(3) Weather Resistant Stabilizer

The weather resistant stabilizer is not particularly limited as long as it may prevent damage to the coating-free metallic thermoplastic resin composition containing the same and the molded product and improve the overall durability even when the ultraviolet ray of a short wavelength is exposed.

The weather resistant stabilizer may suitably include one or more selected from the group consisting of typically known weather resistant stabilizers which may be used in the present invention, for example, an ultraviolet absorber, a light stabilizer, a quencher, a sunscreen, a carbon black, a peroxide decomposer, a radical scavenger, and the like, and is not limited to a specific component. The weather resistant stabilizer may preferably include the ultraviolet absorber and the light stabilizer which have the characteristics of blocking or absorbing the ultraviolet ray which decomposes the polymer chain to prevent changes in the physical properties and the appearance of the polymer, for example, aging.

The ultraviolet absorber may be one or more selected from the group consisting of typically known ultraviolet absorbers which may be used in the present invention, for example, benzotriazole-based compounds, benzophenone-based compounds, and triazine-based compounds, and is not limited to a specific component. Preferably, the ultraviolet absorber may suitably include the benzotriazole-based compounds which have a wide absorption wavelength range and is excellent in an absorption degree in terms of performance.

The benzotriazole-based compound may be 2-(2'-hydroxy-3'-tert-butyl-5'-methylphenyl)-5-chlorobenzotriazole, 2-(2'-hydroxy-5'-methylphenyl)benzotriazole, 2-(2'-hydroxy-5'-tert-butylphenyl)benzotriazole, 2-(2'-hydroxy-3', 5'-di-tert-butylphenyl)benzotriazole, 2-(2'-hydroxy-5'-tert-octylphenyl)benzotriazole, 2-(2'-hydroxy-3',5'-di-tert-octylphenyl)benzotriazole, or the like, Preferably 2-(2'-hydroxy-3'-tert-butyl-5'-methylphenyl)-5-chlorobenzotriazole, and may be preferably 2-(2'-hydroxy-3'-tert-butyl-5'-methylphenyl)-5-chlorobenzotriazole. Further, the benzophenone-based compound may be 2,4-dihydroxybenzophenone, 2-hydroxy-4-methoxybenzophenone, 2-hydroxy-4-methoxybenzophenone-5-sulfonic acid, 2-hydroxy-4-n-octyloxybenzophenone, 2-hydroxy-4-n-dodesulfoxy benzophenone, 2-hydroxy-4-benzyloxybenzophenone, ratio (5-benzoal-4-hydroxy-2-medoxyphenyl) methane, 22'-dihydroxy-4-methoxybenzophenone, 22'-dihydroxy-44'-dimethoxybenzophenone, or the like. Further, the triazine-based compound may be 2-(4,6-Diphenyl-1,3,5-triazin-2-yl)-5-[2-(2-ethylhexanoyloxy) ethoxy] phenol.

The light stabilizer may preferably include a typically known light stabilizer which may be used in the present invention, for example, hindered amine-based compounds which are good in heat resistant at high molecular weight.

The hindered amine-based compound may suitably include (2,2,6,6-tetramethyl-4-piperatyl)succinate, bis(2,2, 6,6-tetramethyl-4-piperidyl)sebacate, bis(1,2,2,6,6-pentamethyl-4-piperatyl)-2-(3,5-di-tert-butyl-4-hydroxybenzyl)-2-butylmalonate, or the like. The hindered amine-based compound may preferably include the bis(2,2,6,6-tetramethyl-4-piperidyl)sebacate.

A mass ratio of the ultraviolet absorber:the light stabilizer of the weather resistant stabilizer may range of about 1:9 to 9:1. The weather resistant stabilizer may be an amount of about 0.1 to 2.0 wt % based on the total weight of the coating-free metallic thermoplastic resin composition. When the content of the weather resistant stabilizer is less than about 0.1 wt %, it may be decomposed by light as well as heat, thereby not functioning as a product, and when the content of the weather resistant stabilizers greater than about 2 wt %, the content of the weather resistant stabilizer may increase the price and may be transferred to the surface to cause stickiness.

(4) Antioxidant

The antioxidant is not particularly limited as long as it contains a component for preventing corrosion of parts of the molded product manufactured by extrusion-molding the coating-free metallic thermoplastic resin composition containing the same.

The antioxidant may contain one or more selected from the group consisting of typical antioxidants which may be used in the present invention, for example, phenol-based antioxidants, sulfur-based antioxidants, and amine-based and phosphorus-based antioxidants, and is not limited to one containing a specific component. The antioxidant preferably may include the phenol-based antioxidant and the phosphorus antioxidant in order to prevent the reduction in the quality caused during the manufacture or use by oxidation and decomposition.

The phenol-based antioxidant may be monophenol series, for example, octadecyl-3-(3,5-di-tert-butyl-4-hydroxy-phenyl), 2,6-di-t-butyl-p-cresol, butylated hydroxyanisole, 2,6-di-t-butyl-p-ethylphenol, stearyl-O-(3,5-di-t-butyl-4-hydroxyphenyl)propionate, isooctyl-3-(3,5-di-t-butyl-4-hydroxyphenyl)propionate, 2,4-bis-(n-octylthio)-6-(4-hydroxy-3,5-di-t-butylanilino-1,3,5-triazine, 2,4-bis[(octylthio)methyl]-o-cresol; a bisphenol series of 2,2'-methylenebis(4-methyl-6-t-butylphenol), 2,2'-methylenebis(4-ethyl-6-t-butylphenol), 4,4'-thiobis(3-Methyl-6-t-butylphenol), 4,4'-butylidenebis(3-methyl-6-t-butylphenol), triethyleneglycol-bis[3-(3-t-butyl-5-methyl-4-hydroxyphenyl)propionate], 1,6-hexanediol-bis[3-(3,5-di-t-butyl-4-hydroxyphenyl)propionate], N,N'-Hexamethylenebis(3,5-di-t-butyl-4-hydroxy-hydrocinnamate), 2,2-thio-diethylenebis[3-(3,5-di-t-butyl-4-hydroxyphenyl)propionate], 3,5-di-t-butyl-4-hydroxybenzylphosphonate-diethylester, 9-bis[1, 1-dimethyl-2-{β-(3-t-butyl-4-hydroxy-5-methylphenyl) propionyloxy}ethyl], 2,4,8,10-tetraoxaspiro[5,5]undecane, bis(3,5-di-t-Bisphenols of butyl-4-hydroxybenzyl sulfonate) calcium; 1,1,3-tris(2-methyl-4-hydroxy-5-t-butylphenyl)butane, 1,3,5-trimethyl-2,4,6-tris(3,5-di-t-Butyl-4-hydroxybenzyl)benzene, tetrakis-[methylene-3-(3',5'-di-t-butyl-4'-hydroxyphenyl)propionate]methane, bis[3,3'-Bis-(4'-hydroxy-3'-t-butylphenyl)butyricacid]glycolester, tris-(3,5-di-t-butyl-4-hydroxybenzyl)-isocyanurate, 1,3,5-tris(3',5'-di-t-butyl-4'-hydroxybenzyl)-5'-triazine-2,4,6-(1H,3H,5H) trione, or the like, and may preferably contain the octadecyl-3-(3,5-di-tert-butyl-4-hydroxy-phenyl).

Further, the phosphorus-based antioxidant may suitably include one or more selected from the group consisting of a phosphite series of tris(2,4-di-tert-butylphenyl)phosphite, triphenyl phosphite, diphenyl isodecyl phosphite, phenyl diisodecyl phosphite, tris(nonylphenyl)phosphite, diisodecylpentaerythritol phosphite, tris(2,4-di-t-butyl)phosphite, cycloneopentane tetraylbis(octadecyl)phosphite, cyclonepentanetetrayl ratio(2,4-di-t-Butylphenyl)phosphite, cyclicneopentanetetrayl ratio(2,4-di-t-butyl-4-methylphenyl)phosphite, bis[2-di-t-butyl-6-methyl-4-[2-(octadecyloxycarbonyl)ethyl]phenyl]hydrogen phosphite; 9,10-dihydro-9-oxa-10-phosphaphenanthrene-10-oxide, 10-(3,5-di-t-butyl-4-hydroxybenzyl)-9,10-dihydro-9-oxa-10-phosphafaphenanthrene-10-oxide, an d 10-decyloxy-9,10-dihydro-9-oxa-10-phosphaphenanthrene-10-oxide, and may preferably contain the tris(2,4-di-tert-butylphenyl)phosphite.

A mass ratio of the phenol-based antioxidant:the phosphorus-based antioxidant of the antioxidant may range from about 1:9 to about 9:1. The antioxidant may be in an amount of about 0.1 to 2 wt % based on the total weight of the coating-free metallic thermoplastic resin composition. When the content of the antioxidant is less than about 0.1 wt %, the resin may be decomposed due to a shear force, and when it is greater than about 2.0 wt %, the product may be discolored (yellowed).

(5) Scratch Resistant Agent

The scratch resistant agent is not particularly limited as long as it contains a component for improving scratch resistant, surface texture, gloss, and the like which prevent the crack and scratch of parts of the molded product manufactured by extrusion-molding the coating-free metallic thermoplastic resin composition including the same.

The scratch resistant agent may be a typical scratch resistant agent which may be used in the present invention, and may preferably include a silicon master batch containing polydimethylsiloxane (PDMS)-based resin which is distributed on the surface of the product to increase the scratch resistant of the surface due to a very small surface tension.

The scratch resistant agent may be in an amount of about 1 to 5 wt % based on the total weight of the coating-free metallic thermoplastic resin composition. When the content of the scratch resistant agent is less than about 1 wt %, a function of the product may be lost due to lack of scratch ability, and when it is greater than about 5 wt %, the appearance may be easily stained, thereby occurring surface appearance defects.

(6) Dispersant

The dispersant is not particularly limited as long as it has a functional group having a positive affinity structure, as a processing aid which may increase dispensability when kneading different materials for the hydrophilic property and the lipophilic property.

The dispersant may suitably include one or more selected from the group consisting of typical dispersants which may be used in the present invention, for example, commercial lubricants, internal lubricants, and external lubricants having an ether group or a carboxyl group in the terminal group of the component contained in the dispersant, and is not limited to a specific component. The dispersant may include the commercial lubricant which may improve the interfacial adhesion, thereby increasing the dispensability and the physical properties. The internal lubricant according to the present invention may be ethylene bis stearamide (EBS), and the external lubricant may be magnesium stearate (Mg-st).

The commercial lubricant may suitably include a silane coupling agent containing the ether group in the terminal group, for example, may be one type or more selected from the group consisting of 3-aminopropyltreiethoxysilane, vinylmethoxy silane, vinyltrimethoxy silane, vinylepoxy silane, vinyltriepoxy silane, 3-aminopropyltriepoxy silane, 3-glycidoxypropyltrimethoxy silane, 3-methoglyoxypropyltrimethoxy silane, 3-mercaptopropyltrimethoxy silane, N-(1,3-dimethylbutylidene)-3-(triepoxy silane)-1-propanamine, N, N-bis[3-(trimethoxysilyl)propyl]ethylenediamine, N-(β-aminoethyl)-γ-aminopropylmethyldimethoxysilane, N-(β-aminoethyl)-γ-aminopropyltrimethoxysilane, γ-glycidoxypropyltriethoxysilane, γ-glycidoxycitrimethyldimethoxy silane, 2-(3,4-epoxycyclohexyl) ethyltrimethoxysilane, γ-methacryloxypropyltrimethoxysilane, γ-methacryloxypropyltriethoxysilane, γ-mercaptopropyltrimethoxysilane, γ-mercaptopropyltriethoxysilane, N-[2-(vinylbenzylamino)ethyl]-3-aminopropyltrimethoxy silane, and the like and combinations thereof, and is not limited to the silane coupling agent containing a specific component, but may be preferably the 3-aminopropyltreiethoxy silane, which is a kind of the amino-based silane which is the best in the compatibility and dispensability with the thermoplastic resin.

The commercial lubricant may be in a form in which a hydrophilic portion and a lipophilic portion have been grafted, and for example, may be MAH-g-WAX, PP-g-MA, SEBS-g-MA, PE-g-MA, or the like, but is not limited to a specific commercial lubricant agent. The commercial lubricant may preferably be the MAH-g-WAX in which maleic anhydride and wax are grafted such that the wax improves the interfacial adhesion with the resin composition of the hydrophilic portion and the maleic anhydride improves the interfacial adhesion with a filler of the lipophilic portion, or the like, thereby increasing the dispensability and the physical properties.

The commercial lubricant may have a melting point of about 85 to 120° C., and a decomposition temperature of about 300° C. or greater. When the melting point is less than about 85° C., it may be easily decomposed and migrated to the surface, thereby occurring stickiness, and when it is greater than about 120° C., it may not be dissolved on the surface so may be seen as foreign substances, thereby reducing the appearance quality. Further, when the decomposition temperature is less than about 300° C., a gas generation rate may be increased upon molding the product.

The dispersant may be in an amount of about 0.1 to 2.0 wt % based on the total weight of the coating-free metallic thermoplastic resin composition. When the content of the dispersant is less than about 0.1 wt %, the metal particles of the resin may not be dispersed, thereby occurring agglomeration, and when it is greater than about 2.0 wt %, it may be migrated to the surface, thereby occurring stickiness.

Molded Product Made of Metallic Thermoplastic Resin Composition

The molded product may be manufactured by injection-molding the metallic thermoplastic resin composition described herein. The molded produce may be preferably manufactured by feeding and injection-molding the master batch contained in the metallic thermoplastic resin composition in the side feeding method.

The molded product may be manufactured by feeding and injection-molding the master batch in the side feeding method to increase the dispensability and compatibility between compositions and to improve the black streaks and the flow marks, thereby improving the metallic texture and the gloss as well as suppressing the occurrence of the appearance defects.

Therefore, the molded product may be an outside mirror scalp, a bumper garnish, a radiator grill garnish, a headlamp bezel, or a roof rack cover, but is not limited to a specific part and may be used in various electric and electronic fields as well as in various interior and exterior materials of the vehicle.

Example

Hereinafter, the present invention will be described in more detail through specific embodiments. The following embodiments are merely illustrative to help understanding of the present invention, and the scope of the present invention is not limited thereto.

Embodiments 1 and 2 and Comparative Examples 1 to 8—the Coating-Free Metallic Thermoplastic Resin Composition and the Molded Product The coating-free metallic thermoplastic resin composition was manufactured by feeding the components shown in Table 1 below to a mixer and well mixing it therein with the content described, and then melt-kneading the mixture at an temperature range of 200 to 270° C. by using an extruder. Next, the composition manufactured considering the weakening of the physical properties due to moisture was dried at 80° C. for 4 hours or more. The dried composition was injection-molded by using an injection molding machine, which was used as a workpiece for a physical property test after standing at room temperature for 2 days.

Method of Measuring Physical Properties

Appearance evaluation: the metallic sense should be excellent and there should be no appearance defects such as weld lines, flow marks, and unmolded portions by injecting 1.8 mm thick 100×350 (horizontal/vertical) workpieces under the same molding conditions.

Flow mark: sensory evaluation which visually observes the flow mark of the workpiece was performed.

Black streak: sensory evaluation which visually observes the black streak of the workpiece was performed.

Glossiness: 60 degree glossiness by using a Glossmeter was measured.

Brightness: a L value by using a color difference meter (CCM) was measured.

TABLE 1

| Component (wt %) | | Embodiment 1 | Embodiment 2 | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|---|
| Weather resistant thermoplastic resin #1) | | 97 | 97 | 97 | 97 | 97 | 97 | 97 | 97 | 97 | 97 |
| Antioxidant | Phenol-based #2) | 0.1 | 0.1 | 0.1 | 0.1 | 0.1 | 0.1 | 0.1 | 0.1 | 0.1 | 0.1 |
| | Phosphorus-based #3) | 0.1 | 0.1 | 0.1 | 0.1 | 0.1 | 0.1 | 0.1 | 0.1 | 0.1 | 0.1 |
| Weather resistance stabilizer | UV absorber #4) | 0.2 | 0.2 | 0.2 | 0.2 | 0.2 | 0.2 | 0.2 | 0.2 | 0.2 | 0.2 |
| | Light stabilizer #5) | 0.2 | 0.2 | 0.2 | 0.2 | 0.2 | 0.2 | 0.2 | 0.2 | 0.2 | 0.2 |
| Scratch resistant agent #6) | | 3 | 3 | 3 | 3 | 3 | 3 | 3 | 3 | 3 | 3 |
| Dispersant | EBS #7) | | | 0.2 | 0.2 | 0.2 | 0.2 | 0.2 | | | |
| | Mg-ST #8) | | | 0.2 | 0.2 | 0.2 | 0.2 | 0.2 | | | |
| | Mah-g-Wax #9) | 0.2 | 0.4 | | | | | | 0.2 | 0.2 | 0.2 |
| Master batch | SAN #10) Single feeding | | | 4 | | | | | 4 | | |
| | Top feeding | | | | 4 | | | | | 4 | |
| | Side feeding | 4 | 4 | | | 4 | | | | | |
| | PS Side feeding | | | | | | 4 | | | | |
| | PE wax Side feeding | | | | | | | 4 | 4 | | |

1) The ASA resin having the physical properties of 5 to 30 g/10 min (220° C., 10 kg) of the melting index, 1.82 MPa, 90 to 95° C. of the heat distortion temperature, 2,000 MPa or more of the flexural modulus
2) As the phenol-based antioxidant, the type was a primary antioxidant, and Irganox 1076 of BASFcompany was used.
3) As the phosphorus-based antioxidant, the type was a secondary antioxidant, and Irgafos 168 of BASFcompany was used.
4) As the benzotriazole-based compound, and LA-300k of ADEKA company was used.
5) As the Hindered amine-based compound, and Tinuvin 770 of BASF company was used.
6) As the silicon master batch containing the Polydimethylsiloxane (PDMS)-based resin and MBxx of DOW company was used.
7) As the stearic acid-based compound, the type was the external lubricant, and Ethylene bis stearamid of Seoul Fine Chemical company was used.
8) As a kind of the metal soap-based lubricant, the type was the internal lubricant, and Magnesium stearate of Seoul Fine Chemical company was used.
9) It may serve as the Mah-g-Wax lubricant and the compatibilizer simultaneously, and 85 to 120° C. of the melting point, 300° C. or more of the decomposition temperature.
10) The carrier used as aluminum pigment master batch with average particle size in the range of 5 to 75 μm in a plateform used the SAN and the range of 3 wt % to 5 wt %.

Metallic texture: a flop index was used as the index of the metallic texture, and as a value of measuring a change in the reflectance by rotating a reflection angle, the luminance of each reflected light was generally measured at 15°, 45°, and 110°, and a BYK Mac spectrophotometer of BYK company was used.

IZOD impact strength: an Izod impact strength (unit: J/m) was measured with the workpiece for measuring the notched Izod impact strength of ¼" thickness in the method specified in the ASTM D256.

Tensile strength: it was measured at 50 mm/min of a test speed according to the method specified in the ASTM D638.

Elongation: it was measured at 50 mm/min of the test speed according to the method specified in the ASTM D638.

Flexural strength: it was measured at 3 mm/min of the test speed according to the method specified in the ASTM D790.

Flexural modulus: it was measured at 3 mm/min of the test speed according to the method specified in the ASTM D790.

Rockwell hardness: it was measured by an R Scale method according to the method specified in the ASTM D785.

Heat deflection temperature: it was measured by 1.82 MPa of a stress load according to the method specified in the ASTM D648.

Experimental Example 1: Comparison of the Texture and Gloss of the Molded Product According to the Polymer Resin and Dispersant Components Contained in the Master Batch The flow mark, black streak, glossiness, brightness, and metallic texture of the molded products manufactured according to the Embodiments 1 and 2 and Comparative Examples 1 to 5 were evaluated and the results thereof were shown in Table 2 and FIGS. 1 to 4.

TABLE 2

| Items | | Embodiment 1 | Embodiment 2 | Comparative Example 1 | Comparative Example 2 | Comparative Example 3 | Comparative Example 4 | Comparative Example 5 |
|---|---|---|---|---|---|---|---|---|
| Flow mark | Visually | ⊚ | ⊚ | Δ | ⊚ | X | X | X |
| Black streak | visually | ⊚ | ⊚ | Δ | ⊚ | X | X | X |
| Glossiness | 60° | 96 | 96 | 75 | 81 | 89 | 77 | 62 |
| Brightness | L (45/0) | 84 | 84 | 76 | 77 | 82 | 79 | 76 |
| Metallic texture | F.I. | 14.91 | 14.93 | 13.05 | 13.65 | 13.72 | 12.91 | 12.75 |

Figure 2:
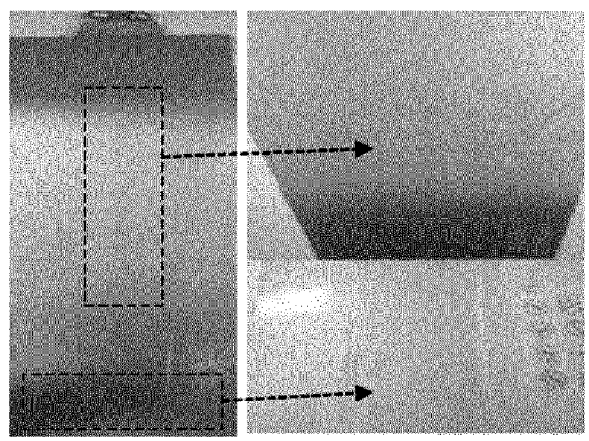
FIG. 2 shows an image that the black streaks and flow marks of a molded product manufactured according to a Comparative Example 5 were not improved as compared with the molded product of the Embodiment 1 and the metallic texture and gloss thereof were reduced.
Figure 3:
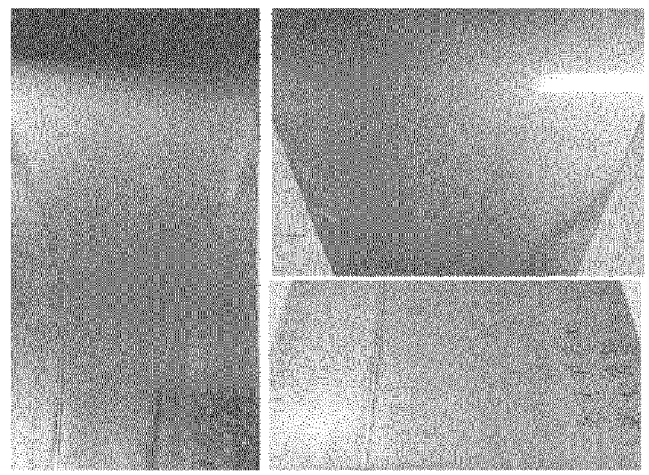
FIG. 3 shows an image that black streaks and flow marks were improved and metallic texture and gloss were excellent in a molded product (Embodiment 2) manufactured according to an exemplary embodiment of the present invention.
Figure 4:
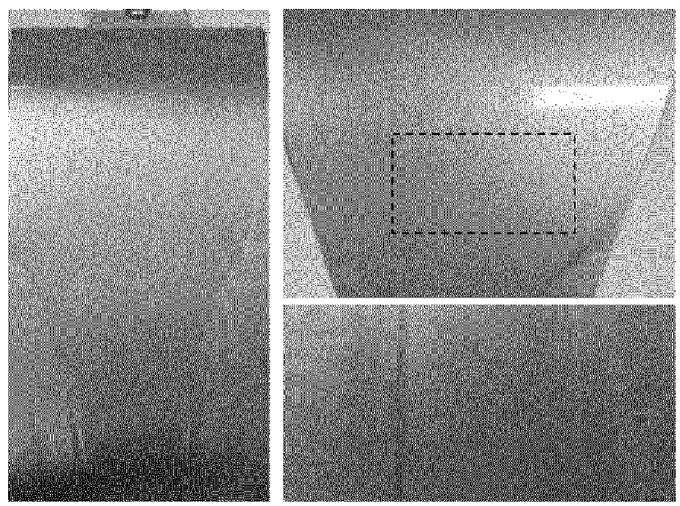
FIG. 4 shows an image that the black streaks and flow marks of a molded product manufactured according to a Comparative Example 3 were not improved as compared with the molded product of the Embodiment 2 and the metallic texture and gloss thereof were reduced.

As shown in Table 2 and FIGS. 1 and 2, the molded product provided in the side feeding method by using the dispersant as the compatibilizer and the polymer resin of the master batch as the SAN (Embodiment 1) had more improved black streak and flow mark and better metallic texture and gloss than those of the molded product provided in the side feeding method by including the internal lubricant and the external lubricant as the dispersant and using the polymer resin of the master batch as the polyethylene wax (Comparative Example 5). Further, as shown in Table 2 and FIGS. 3 and 4, the molded product manufactured by using the dispersant as the compatibilizer (Embodiment 2) had more improved black streak and flow mark and increased dispensability and bonding force entirely than those of the molded product manufactured by using the dispersant as the internal lubricant and the external lubricant (Comparative Example 3), thereby improving the gloss and the metallic sense.

Therefore, the molded products manufactured by using the dispersant as the compatibilizer, and using the polymer resin as the SAN in the side feeding method may increase the dispensability and compatibility between compositions and improve the black streaks and the flow marks, thereby improving the metallic texture and the gloss as well as suppressing the occurrence of the appearance defects.

Experimental Example 2: Comparison of the Physical Properties, Metallic Texture, and Gloss of the Molded Product According to the Polymer Resin Contained in the Master Batch Various physical properties and the flow mark, black streak, glossiness, brightness, and metallic texture of the molded product manufactured according to the Embodiment 1 and the Comparative Example 6 were evaluated and the results thereof were shown in Table 3 below.

TABLE 3

| Physical properties | Test conditions | Unit | Comparative Example 6 | Embodiment 1 |
|---|---|---|---|---|
| Melting index | 220° C., 10 kg | g/10 min | 23.7 | 22.1 |
| Specific gravity | — | — | 1.086 | 1.086 |
| IZOD impact strength | 6.4 mm. 23° C. | J/m | 103 | 113 |
| Tensile strength | 50 mm/min, 3.2 mm | MPa | 41.4 | 42.7 |
| Elongation | 50 mm/min, 3.2 mm | % | 28 | 24 |
| Flexural strength | 3 mm/min, 6.4 mm | MPa | 61.3 | 62.3 |
| Flexural modulus | 3 mm/min, 6.4 mm | MPa | 2,230 | 2,310 |
| Rockwell hardness | R-Scale | R-scale | 98 | 107 |
| Heat deformation temperature | 1.82 MPa, 6.4 mm | ° C. | 94.7 | 95.1 |

TABLE 3-continued

| Physical properties | Test conditions | Unit | Comparative Example 6 | Embodiment 1 |
|---|---|---|---|---|
| Flow mark | — | — | x | ○ |
| Black streak | — | — | x | ○ |
| Glossiness | — | — | 62 | 96 |
| Brightness | — | — | 76 | 84 |
| Remarks | — | — | — | — |

As shown in Table 3, the molded product provided in the side feeding method by using the polymer resin of the master batch as the SAN (Embodiment 1) had better various physical properties and improved black streak and flow mark and better metallic texture and gloss than those of the molded product provided in the side feeding method by using the polymer resin of the master batch as the polyethylene wax (Comparative Example 6). Therefore, the molded products manufactured by providing in the side feeding method by using the dispersant as the SAN not only improve various physical properties but also increase the dispensability and compatibility between compositions and improve the black streak and the flow mark, thereby improving the metallic texture and the gloss as well as suppressing the appearance defects.

Experimental Example 3: Comparison of the Physical Properties, Metallic Texture, and Gloss of the Molded Product by the Master Batch Feeding Method Various physical properties, flow mark, black streak, glossiness, brightness, and metallic texture of the molded product manufactured according to the Embodiment 1 and Comparative Examples 7 and 8 were evaluated, and the results thereof were shown in Table 4 below.

TABLE 4

| Physical properties | Test conditions | Unit | Comparative Example 7 | Comparative Example 8 | Embodiment 1 |
|---|---|---|---|---|---|
| Melting index | 220° C., 10 kg | g/10 min | 21.8 | 21.6 | 22.1 |
| Specific gravity | — | — | 1.086 | 1.086 | 1.086 |
| IZOD impact strength | 6.4 mm. 23° C. | J/m | 114 | 117 | 116 |
| Tensile strength | 50 mm/min, 3.2 mm | MPa | 42.4 | 43.2 | 42.7 |
| Elongation | 50 mm/min, 3.2 mm | % | 24 | 21 | 24 |
| Flexural strength | 3 mm/min, 6.4 mm | MPa | 61.7 | 62.4 | 62.3 |
| Flexural modulus | 3 mm/min, 6.4 mm | MPa | 2,220 | 2,270 | 2,310 |
| Rockwell hardness | R-Scale | R-scale | 103 | 104 | 104 |
| Heat deformation temperature | 1.82 MPa, 6.4 mm | ° C. | 94.5 | 95.4 | 95.1 |
| Flow mark | — | — | X | ○ | ○ |
| Black streak | — | — | X | ○ | ○ |
| Glossiness | — | — | 75 | 81 | 96 |
| Brightness | — | — | 76 | 77 | 84 |
| Remarks | — | — | Dispersion problem | Dispersibility was good but metal was broken | Dispersibility was good and metallic sense was increased |

As shown in Table 4, the molded products providing the master batch in a single feeding method or a top feeding method (Comparative Examples 7 and 8) occurred a problem in the dispensability or a problem of breaking the metal and the molded product providing the master batch in the side feeding method (Embodiment 1) was excellent in the dispensability and also excellent in the metallic sense. As such, various physical properties of the molded products were improved, the black streaks and the flow marks were improved, and the metallic sense and the gloss were more excellent.

Accordingly, the molded product manufactured by providing in the side feeding method by using the dispersant as the SAN may not only improve more various physical properties but also increase the dispensability and compatibility between compositions. Further, the molded product manufactured by providing in the side feeding method by using the dispersant as the SAN may improve the black streaks and the flow marks than those of the molded product manufactured by providing in the single feeding method or the top feeding method, thereby improving the metallic texture and the gloss as well as suppressing the occurrence of the appearance defects.

What is claimed is:

1. A coating-free metallic thermoplastic resin composition, comprising:
   an amount of about 97 wt % of a weather resistant thermoplastic resin;
   an amount of about 4 wt % of a masterbatch;
   an amount of about 0.4 wt % of a weather resistant stabilizer;
   an amount of about 0.2 wt % of an antioxidant;
   an amount of about 3 wt % of a scratch resistant agent; and
   an amount of about 0.2 to 0.4 wt % of a dispersant,
   all the wt % based on the total weight of the coating-free metallic thermoplastic resin composition,
   wherein the masterbatch is a metallic component and a polymer resin, and
   the polymer resin is a styrene-acrylonitrile (SAN) resin,
   the dispersant is MAH-g-WAX,
   the weather resistant stabilizer is an UV absorber and a light stabilizer,
   the UV absorber is a benzotriazole-based compound,
   the light stabilizer is a hindered amine-based compound,
   the antioxidant is a phenol-based antioxidant and a phosphorous-based antioxidant.

2. The coating-free metallic thermoplastic resin composition of claim 1,
   wherein the weather resistant thermoplastic resin comprises an acrylonitrile styrene acrylate (ASA) resin which has a melting index of about 5 to 30 g/10 min (220° C., 10 kg), and a heat deformation temperature of about 90 to 95° C.

3. The coating-free metallic thermoplastic resin composition of claim 1,
wherein the master batch comprises an amount of about 20 to 80 wt % of a metallic component and an amount of about 20 to 80 w % of a polymer resin, based on the total weight of the master batch.

4. The coating-free metallic thermoplastic resin composition of claim 3,
wherein the metallic component comprises one or more selected from the group consisting of aluminum (Al), copper (Cu), and pearl.

5. The coating-free metallic thermoplastic resin composition of claim 1,
wherein a mass ratio of the UV absorber: the light stabilizer of the weather resistant stabilizer ranges from about 1:9 to about 9:1.

6. The coating-free metallic thermoplastic resin composition of claim RUM,
wherein a mass ratio of the phenol-based antioxidant: the phosphorous-based antioxidant of the antioxidant ranges from about 1:9 to about 9:1.

7. A molded product manufactured by injection-molding the coating-free metallic thermoplastic resin composition of claim 1.

8. The molded product of claim 7,
wherein the molded product is manufactured by feeding and injection-molding the master batch comprised in the coating-free metallic thermoplastic resin composition in a side feeding method.

\* \* \* \* \*